US008255497B2

(12) United States Patent
Brant et al.

(10) Patent No.: US 8,255,497 B2
(45) Date of Patent: Aug. 28, 2012

(54) METHOD OF DISCOVERY AND COMMUNICATION WITH INDUSTRIAL EQUIPMENT

(75) Inventors: Dmitry Brant, Euclid, OH (US); Stephen M. Kainec, S. Euclid, OH (US)

(73) Assignee: Lincoln Global, Inc., City of Industry, CA (US)

( * ) Notice: Subject to any disclaimer, the term of this patent is extended or adjusted under 35 U.S.C. 154(b) by 461 days.

(21) Appl. No.: 12/263,767

(22) Filed: Nov. 3, 2008

(65) Prior Publication Data
US 2010/0115067 A1 May 6, 2010

(51) Int. Cl.
*G06F 15/177* (2006.01)
(52) U.S. Cl. ........ 709/221; 709/222; 700/179; 700/180; 700/83
(58) Field of Classification Search .......... 709/220–229, 709/200, 201–204, 249–250; 700/9–10, 700/19–20, 95–96, 169, 174, 179, 247–248, 700/275; 710/8–9, 16–19
See application file for complete search history.

(56) References Cited

U.S. PATENT DOCUMENTS

| | | | | |
|---|---|---|---|---|
| 5,980,078 | A * | 11/1999 | Krivoshein et al. | 700/1 |
| 6,098,116 | A * | 8/2000 | Nixon et al. | 710/8 |
| 6,901,439 | B1 * | 5/2005 | Bonasia et al. | 709/220 |
| 7,624,164 | B2 * | 11/2009 | Lu et al. | 709/220 |
| 7,719,961 | B2 * | 5/2010 | Sichner et al. | 370/225 |
| 7,729,284 | B2 * | 6/2010 | Ukrainetz et al. | 370/254 |
| 2003/0033052 | A1 * | 2/2003 | Hillen et al. | 700/212 |
| 2004/0210330 | A1 * | 10/2004 | Birkle | 700/96 |
| 2005/0086332 | A1 | 4/2005 | Nakazawa | |
| 2005/0251552 | A1 * | 11/2005 | Champel et al. | 709/204 |
| 2006/0031488 | A1 * | 2/2006 | Swales | 709/224 |
| 2006/0159032 | A1 | 7/2006 | Ukrainetz et al. | |
| 2007/0073850 | A1 * | 3/2007 | Callaghan et al. | 709/220 |
| 2008/0140815 | A1 | 6/2008 | Brant et al. | |
| 2009/0006585 | A1 * | 1/2009 | Chen | 709/220 |
| 2010/0016994 | A1 * | 1/2010 | Hansen et al. | 700/9 |

FOREIGN PATENT DOCUMENTS
WO 03/025777 A1 3/2003

OTHER PUBLICATIONS
PCT/IB2009/007219 International Search Report dated Mar. 11, 2010.
PCT/IB2009/007219 Written Opinion dated Mar. 11, 2010.

* cited by examiner

*Primary Examiner* — Greg C Bengzon
(74) *Attorney, Agent, or Firm* — Shannon V McCue; Hahn Loeser & Parks LLP (57) ABSTRACT

A method, a computer-readable medium, a software application, and a computer-based apparatus for initially establishing communication with a device on a local area network (LAN) in a substantially automated manner. A broadcast discovery request is transmitted over the network and the network is monitored for responses from devices connected to the network. A responding device is selected and a determination is made as to if a primary IP address of the selected device is within a predetermined subnet. Otherwise, a determination is made as to if a current alternate IP address of the selected device is within the predetermined subnet. Otherwise, a new alternate IP address is generated and may be conditionally assigned to the selected device. One of the primary IP address, the current alternate IP address, or the new alternate IP address is used to connect to the selected device for the purpose of communicating with the selected device.

44 Claims, 5 Drawing Sheets

METHOD OF DISCOVERY AND COMMUNICATION WITH INDUSTRIAL EQUIPMENT

TECHNICAL FIELD

The claimed invention relates to communicating with devices on a network and, more particularly, to initially establishing communication with a device on a local area network in a substantially automated manner.

BACKGROUND

In a local area network (LAN) environment, a user may desire to connect a host computer (e.g., a PC) to the LAN in order to communicate with a particular device on the LAN. For example, the LAN may be an Ethernet LAN and a device connected to the LAN may be a welding power source that is Ethernet capable. For older products, communication was often accomplished by a serial port instead of by Ethernet, but newer products are often Ethernet capable. The user may desire to communicate with the device in order to, for example, diagnose a problem with the device, extract and record data logs from the device, update the programmable firmware of the device, or monitor a process performed by the device (e.g., a welding process).

One of the hurdles in communicating with a device on a LAN is the initial establishment of communication with the device. For example, a user may connect a host computer to a LAN and may desire to communicate with a particular device on the LAN via the host computer. However, the user may not know the IP address of the device and, therefore, may have to waste time tracking down the IP address of the device. Furthermore, even if the user knows the IP address of the device, the user may not be network savvy and, therefore, may not know how to set up the host computer using the IP address of the device to connect to the device. As a result, the user may have to contact an IT person to help establish communication between his host computer and the device on the LAN.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

The claimed invention is particularly applicable for use in connection with welding equipment in a welding environment such as welding power sources that are capable of being operatively connected to a local area network (LAN) (e.g., an Ethernet LAN) and, therefore, embodiments of the present invention will be described with particular reference to welding equipment used in connection with a LAN. However, the claimed invention has broader applications and may be used with other types of network connectable devices.

An embodiment of the present invention comprises a method of initially establishing communication with a device on a local area network (LAN) in a substantially automated manner. Another embodiment of the present invention comprises a computer readable medium having encoded thereon computer executable instructions for performing a method of initially establishing communication with a device on a local area network (LAN) in a substantially automated manner. A further embodiment of the present invention comprises a computer-based apparatus for initially establishing communication with a device on a local area network (LAN) in a substantially automated manner. Another embodiment of the present invention comprises a computer-based apparatus including a software application for initially establishing communication with a device on a local area network (LAN) in a substantially automated manner.

The various embodiments of the present invention provide for initially establishing communication with a device on a local area network by launching a broadcast discovery request over the network, monitoring the network for responses to the broadcast discovery request from devices connected to the network, allowing selection of a device from a list of the devices that respond to the broadcast discovery request, determining if a primary IP address of the selected device is within a subnet of the computer-based apparatus, determining if a current alternate IP address of the selected device is within the subnet of the computer-based apparatus if the current alternate IP address exists and if the primary IP address is determined not to be within the subnet of the computer-based apparatus, generating a new alternate IP address if the primary IP address and the current alternate IP address, if existing, of the selected device are determined not to be within the subnet of the computer-based apparatus, checking that the new alternate IP address does not already exist on the network if the new alternate IP address is generated, and assigning the new alternate IP address to the selected device if the new alternate IP address is generated and the new alternate IP address does not already exist on the network.

These and other features of the claimed invention, as well as details of illustrated embodiments thereof, will be more fully understood from the following description and drawings.

DETAILED DESCRIPTION

Figure 1:
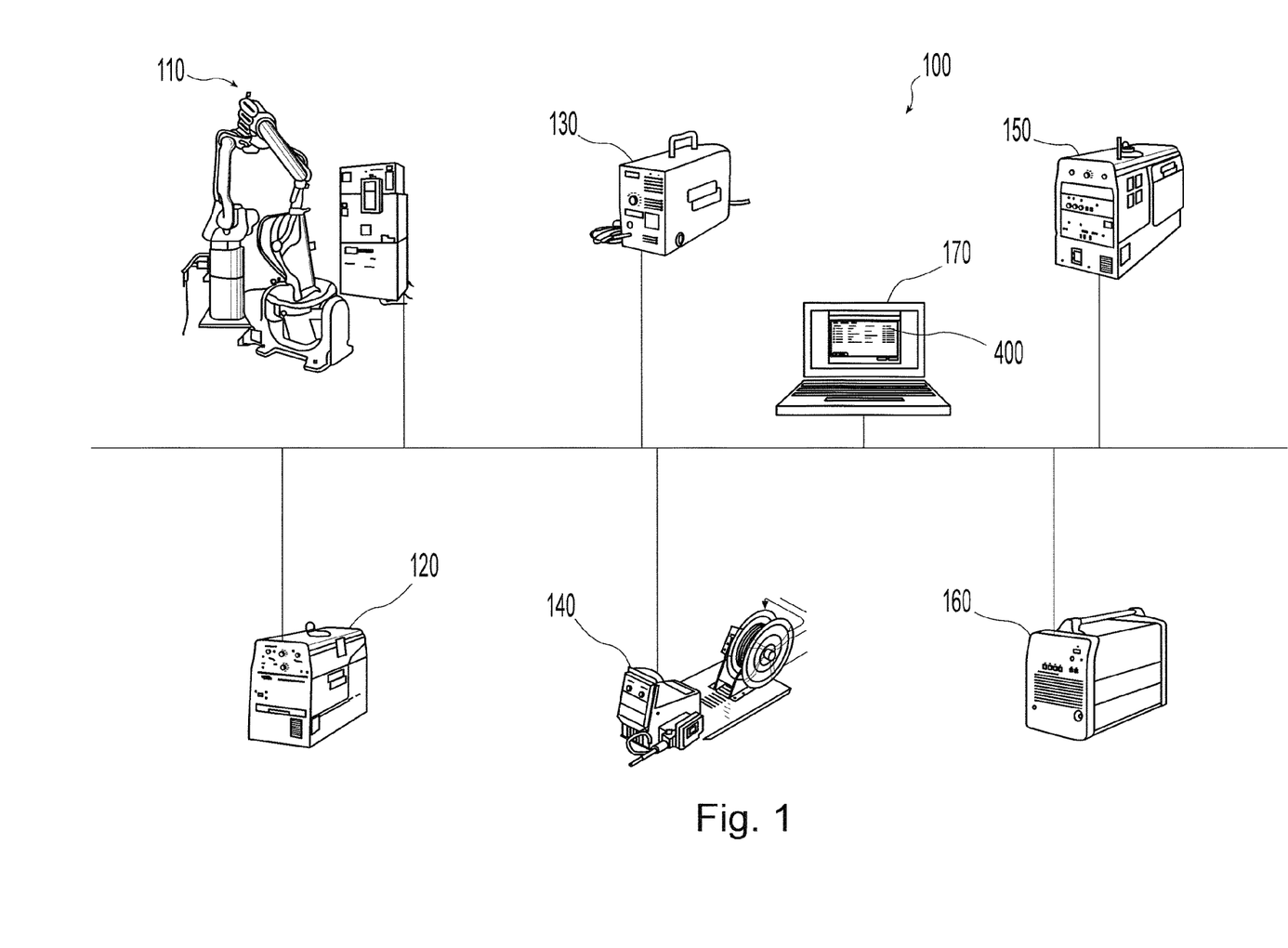
FIG. 1 illustrates a schematic block diagram of a first exemplary embodiment of a local area network (LAN)

FIG. 1 illustrates a schematic block diagram of a first exemplary embodiment of a local area network (LAN) 100 in a welding environment. The LAN 100 is an Ethernet-based LAN. Ethernet-based LANs are well-known in the art. LANs based on protocols other than Ethernet are possible as well. A plurality of devices are operatively connected to the LAN 100 including a robotic welding system 110, a first welding power source 120, a first welding wire feeder 130, a second welding wire feeder 140, a second welding power source 150, and a third welding power source 160. All of the devices 110-160 are Ethernet capable (i.e., support Ethernet communications). The LAN 100 may be connected to other devices as well such as, for example, a welding user interface.

Each of the devices 110-160 are configured to have a primary IP address. In addition, each of the devices may be configured to have an alternate IP address, in accordance with an embodiment of the present invention. As a result, communication with any particular device on the LAN 100 may be accomplished using the primary IP address of the particular device or the alternate IP address of the particular device.

A user may desire to establish communication with one of the devices 110-160 on the LAN 100. The user may operatively connect a computer-based apparatus 170 (e.g., a laptop PC serving as a host computer) to the LAN 100 to facilitate establishment of communication with a device (e.g., the robotic welding system 110). The computer-based apparatus 170 has its own IP address. The user may desire to communicate with the device in order to, for example, diagnose a problem with the device, extract and record data logs from the device, update the programmable firmware of the device, or monitor a process performed by the device (e.g., a welding process). Other reasons for communication are possible as well.

In general, a LAN is a computer network that spans a relatively small area and includes a series of cables and switches or hubs. A LAN may be confined to a single office or group of buildings, for example. Many LANs connect workstations and personal computers (PCs). Each node (individual device) in a LAN typically has some kind of central processing capability to execute programs and access other devices on the LAN. As a result, many users may share devices and data on the LAN and communicate with each other, for example.

Of the different types of LANs, LANs that use the Ethernet protocol are very common. A protocol includes the rules and encoding specifications for sending data on the LAN and how devices identify each other on a network. A protocol also determines whether a network uses a peer-to-peer or client/server architecture, for example. LANs may be configured, for example, in a ring configuration, a hub/spoke configuration, or a serial configuration. The media used to connect devices together on a LAN may include twisted-pair wire, coaxial cable, or fiber optic cables, for example. However, devices on a wireless LAN communicate via radio frequency techniques.

Figure 2:
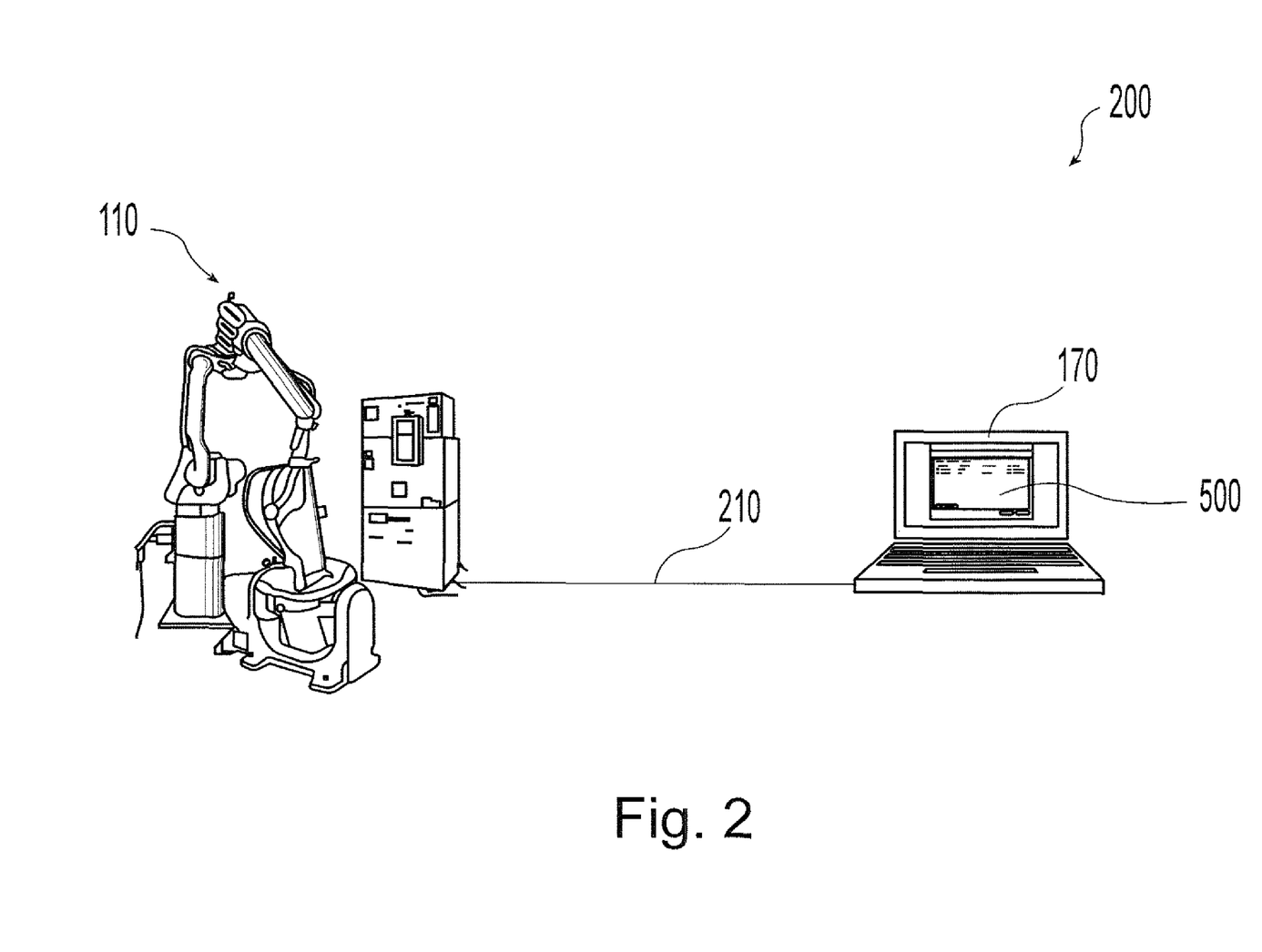
FIG. 2 illustrates a schematic block diagram of a second exemplary embodiment of a local area network (LAN)

Even though the LAN 100 includes a plurality of devices 110-160 and a host computer 170, the term LAN, as used herein, may also refer to a much simpler configuration. For example, FIG. 2 illustrates a schematic block diagram of a second exemplary embodiment of a local area network (LAN) 200. The LAN 200 includes the robotic welding system 110 and the computer-based apparatus 170. The computer-based apparatus 170 connects directly to an Ethernet port of the robotic welding system 110 via a straight-through cross-over cable 210, facilitating establishment of an Ethernet connection between the computer-based apparatus 170 and the robotic welding system 110.

Figure 3:
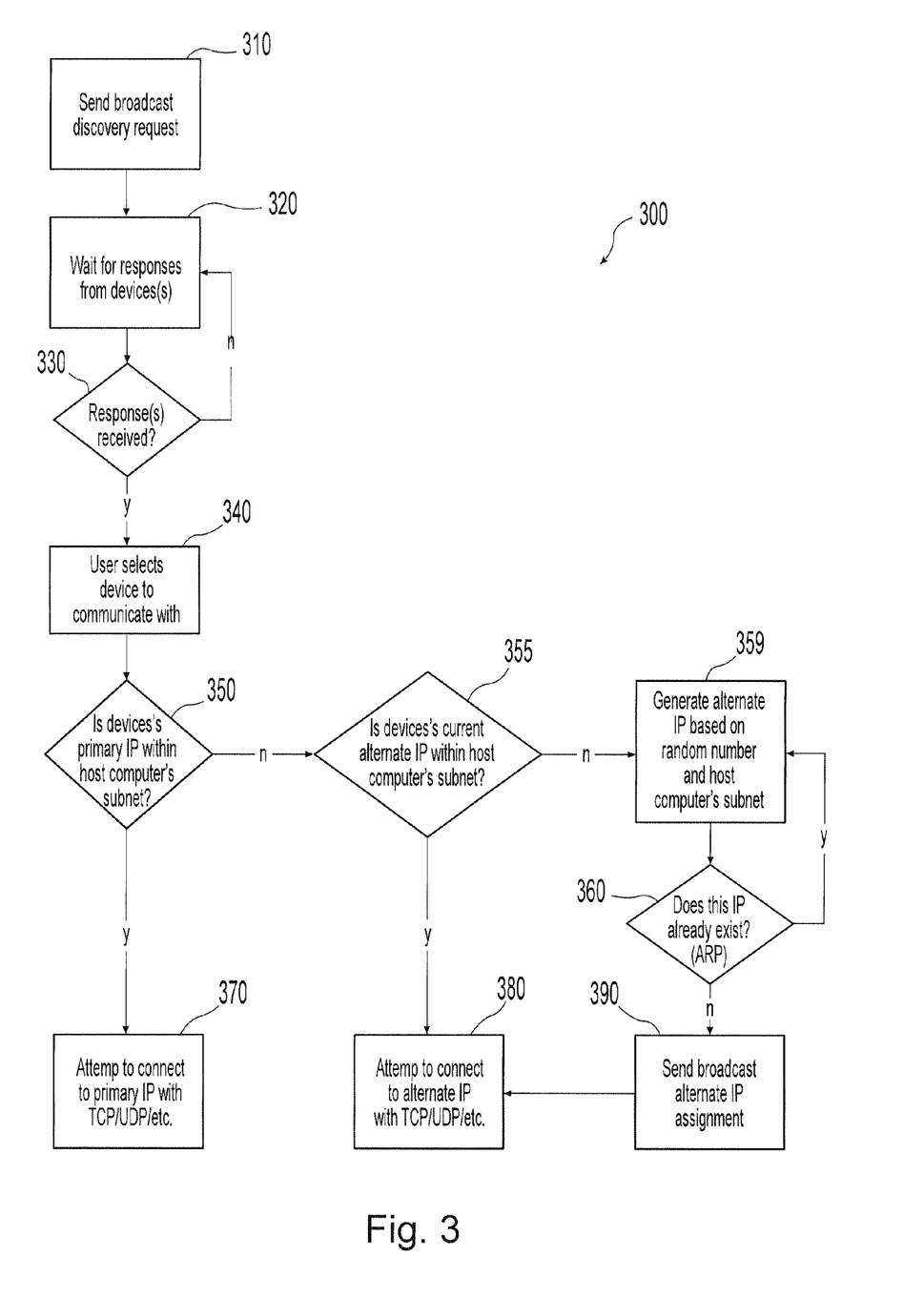
FIG. 3 illustrates a flow chart of an exemplary embodiment of a method of initially establishing communication with a device on the local area network (LAN) of FIG. 1 or FIG. 2 in a substantially automated manner.

FIG. 3 illustrates a flow chart of an exemplary embodiment of a method 300 of initially establishing communication with a device (e.g., 110) on the local area network (LAN) 100 of FIG. 1 or 200 of FIG. 2 in a substantially automated manner. A user connects a host computer 170 to a network as in FIG. 1 (or directly to a device as in FIG. 2) and launches a "create connection" software application hosted on the host computer 170. The software application then proceeds to perform the method 300 with minimal user interaction (i.e., substantially automatically).

In step 310, the host computer sends or transmits a broadcast discovery request over the network to a specific port of all the devices connected to the network. The broadcast discovery request includes the media access control (MAC) address of the requesting host computer along with a special pseudo IP address (e.g., 255.255.255.255) indicating that this is a broadcast request to all devices on the network. The purpose of the broadcast discovery request is to determine or verify which devices are currently connected to the network and, therefore, may be accessed for communication.

In step 320, the host computer monitors the network for responses to the broadcast discovery request from devices connected to the network. Once the responses are received in step 330 then, in step 340, the user selects a device from a list of the devices that responded to the broadcast discovery request in order to establish communication with that selected device. When the user selects a device, the host computer may send out another broadcast message causing a light-emitting diode (LED) on the selected device to physically blink, thus allowing the user to verify that the device has been selected. In accordance with an embodiment of the present application, the list of devices is displayed in an application window by the software application performing the method 300 such that the user may select a device from the application window using, for example, a mouse.

Figure 4:
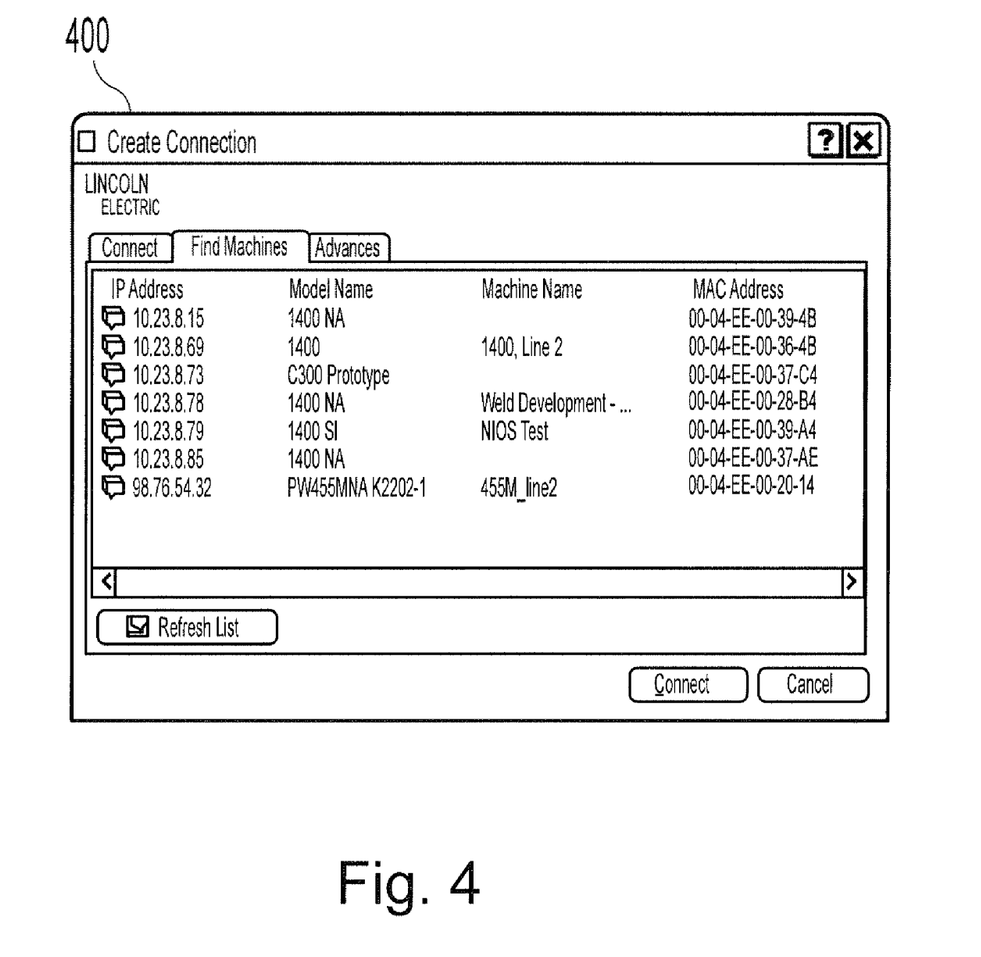
FIG. 4 illustrates an exemplary embodiment of an application window displaying a plurality of devices connected to the local area network (LAN) of FIG. 1.
Figure 5:
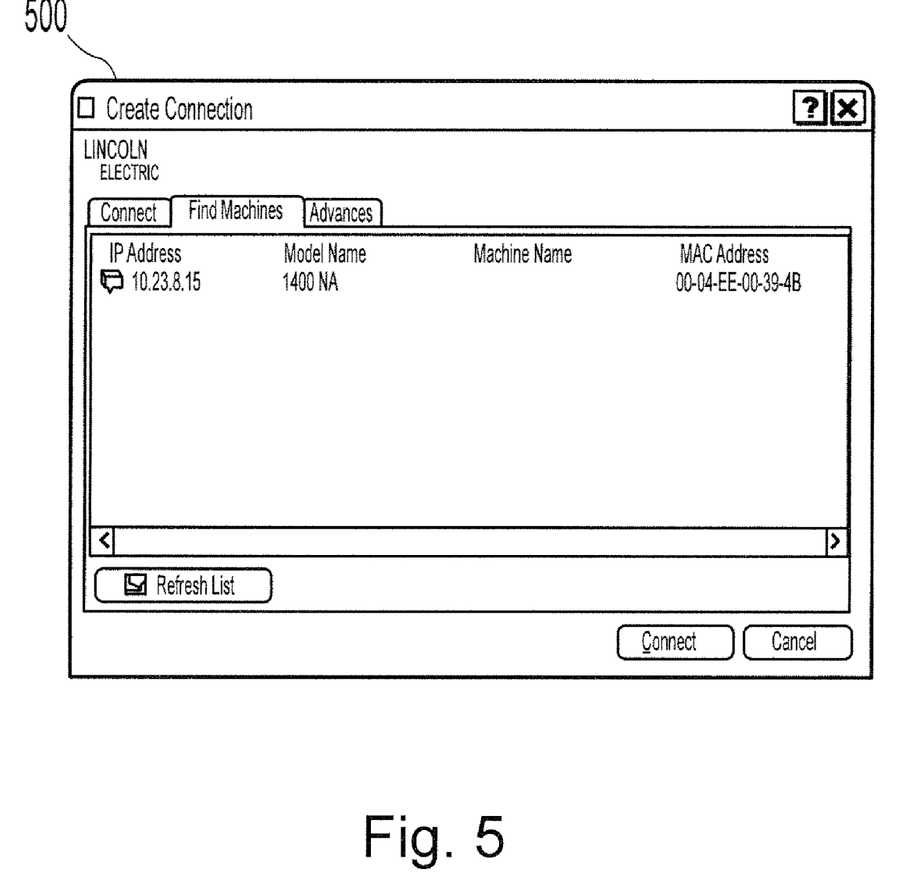
FIG. 5 illustrates an exemplary embodiment of an application window displaying a single device connected to the local area network (LAN) of FIG. 2.

FIG. 4 illustrates an exemplary embodiment of an application window 400 displaying a plurality of devices connected to the local area network (LAN) 100 of FIG. 1. Similarly, FIG. 5 illustrates an exemplary embodiment of an application window 500 displaying a single device connected to the local area network (LAN) 200 of FIG. 2. The application windows 400 and 500 display a primary IP address of each device, a model name of each device, a machine name of each device, and a MAC address of each device, in accordance with an embodiment of the present invention. An application window may further display a current alternate IP address of each device, in accordance with another embodiment of the present invention. Even though a current alternate IP address may not be displayed, a current alternate IP address may exist for each device and be communicated to the host computer 170 in a response to the broadcast discovery request. Other information may possibly be included in the responses and displayed as well.

In step 350, the software application on the host computer 170 determines if a primary IP address of the selected device is within a predetermined subnet. In accordance with an embodiment of the present invention, the predetermined subnet corresponds to the subnet of the host computer 170 and is specified by a subnet portion of the IP address of the host computer 170. A subnet specifies a range of IP addresses on a particular network or portion of a network.

The host computer 170 has an IP address and a subnet mask that allows the part of the IP address that is reserved for the network (i.e., the subnet) to be identified. The subnet of the host computer 170 may be determined from the IP address of the host computer 170 by performing a logical 'AND' operation on the IP address of the host computer 170 and the subnet mask of the host computer 170, as is illustrated later herein via example. If, in step 350, the selected device is determined to be within the predetermined subnet then, in step 370, the host computer 170 attempts to connect (e.g. via a transmission control protocol (TCP), a user-defined protocol (UDP), etc.) to the selected device using the primary IP address of the selected device.

If, in step 350, the selected device is determined to not be within the predetermined subnet then, in step 355, the software application on the host computer 170 determines if a current alternate IP address of the selected device is within the predetermined subnet, if a current alternate IP address exists for the selected device. If, in step 355, the selected device is determined to be within the predetermined subnet then, in step 380, the host computer 170 attempts to connect to the selected device using the current alternate IP address of the selected device.

If, in step 355, the selected device is determined to not be within the predetermined subnet then, in step 359, the software application on the host computer 170 generates a new alternate IP address by generating a random number and by using a subnet mask and a subnet (i.e., predetermined subnet) of the host computer 170.

As an example, the software application of the host computer 170 may generate a 32-bit random number represented herein as 148.222.86.3. The subnet mask of the host computer 170 may be a 32-bit number represented as, for example, 255.255.0.0. If the IP address of the host computer 170 is a 32-bit number represented as, for example, 192.168.1.1, then the subnet of the host computer may be found by doing a bit-wise logical 'AND' operation on the IP address and the subnet mask yielding the subnet 192.168.0.0.

In order to generate a new alternate IP address for the selected device that is within the subnet of the host computer 170, the software application of the host computer 170 generates the inverse (logical 'NOT') of the subnet mask resulting in an inverse subnet mask of 0.0.255.255 and then performs a bit-wise logical 'AND' operation on the inverse subnet mask 0.0.255.255 and the random number 148.222.86.3 resulting in a host portion of the new alternate IP address of the selected device being 0.0.86.3. The software application of the host computer then appends the subnet portion of the host computer 170 to the host portion of the new alternate IP address to form the complete new alternate IP address being 192.168.86.3 (new alternate IP address). As a result, the new alternate IP address is now within the subnet of the host computer 170.

In step 360, the software application on the host computer 170 launches an address resolution protocol (ARP) capability to check that the new alternate IP address does not already exist on the network. The ARP protocol maps addresses between a data link layer and a network layer in a communication model. The data link layer uses MAC addresses and the network layer uses IP address.

If the new alternate IP address does already exist on the network (LAN), then the method reverts back to step 359 to generate another new alternate IP address. The ARP capability is typically a part of the operating system of the host computer 170 and sends out a broadcast request on the LAN to determine if any devices on the network are currently using or have the new alternate IP address. Furthermore, in accordance with an embodiment of the present invention, when generating a new alternate IP address, the new alternate IP address is further checked to make sure that it is not the first or last IP address in that subnet. Typically, the first IP address in a subnet is used for broadcasting, and the last IP address in a subnet is defined to be illegal.

If the new alternate IP address does not already exist on the network then, in step 390, the software application on the host computer 170 assigns the new alternate IP address to the selected device. The new alternate IP address may be assigned by sending another broadcast request onto the network that includes the new alternate IP address, the MAC address of the selected device, and the special pseudo IP address (e.g., 255.255.255.255) indicating that this is a broadcast request to all devices on the network. The selected device receives and accepts the broadcast request (based on the MAC address) and sets attributes within its Ethernet layer to listen on this new alternate IP address as well as on its primary IP address. The new alternate IP address becomes the current alternate IP address. Once the new alternate IP address is assigned to the selected device then, in step 380, the host computer 170 attempts to connect to the selected device using the new alternate IP address of the selected device.

Once the initial connection from the host computer 170 to the selected device is established (either via the primary IP address, current alternate IP address, or new alternate IP address of the selected device) using the method 300, then the user (using the host computer 170) may proceed to communicate with the selected device to, for example, diagnose a problem with the device, extract and record data logs from the device, update the programmable firmware of the device, or monitor a process performed by the device (e.g., a welding process). Other reasons for communication are possible as well.

In accordance with an embodiment of the present invention, when the host computer 170 is finished communicating with the selected device via the methods described herein and is about to disconnect from the device, the alternate IP address of the selected device may be reset to some predetermined value such as, for example, 0.0.0.0 via the "create connection" software application. Furthermore, the alternate IP address of the selected device may be reset by re-powering up the selected device (i.e., turning the power off and then on again), for example.

Even though embodiments of the present invention have been described herein with respect to welding equipment devices, such embodiments are also applicable to other types of devices that may be connected to a LAN such as, for example, printers or other computers.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of initially establishing communication with a welding device on a local area network (LAN) in a substantially automated manner, said method comprising:

transmitting a broadcast discovery request over said network;

monitoring said network for responses to said broadcast discovery request from devices connected to said network;

selecting a welding device from a list of said devices that respond to said broadcast discovery request, and transmitting a broadcast message causing an indicator on said selected welding device to activate;

using a computer to determine if a primary IP address of said selected welding device is within a predetermined subnet;

using a computer to determine if a current alternate IP address of said selected welding device is within said predetermined subnet if said current alternate IP address exists and if said primary IP address is determined not to be within said predetermined subnet;

generating a new alternate IP address if said primary IP address and said current alternate IP address, if existing, of said selected welding device are determined not to be within said predetermined subnet;

checking that said new alternate IP address does not already exist on the network if said new alternate IP address is generated; and assigning said new alternate IP address to said selected welding device if said new alternate IP address is generated and said new alternate IP address does not already exist on the network.

2. The method of claim 1 further comprising attempting to connect to said primary IP address of said selected welding device if said primary IP address of said selected welding device is determined to be within said predetermined subnet.

3. The method of claim 1 further comprising attempting to connect to said current alternate IP address of said selected welding device if said primary IP address of said selected welding device is determined not to be within said predetermined subnet and said current alternate IP address of said selected welding device is determined to be within said predetermined subnet.

4. The method of claim 1 further comprising attempting to connect to said new alternate IP address of said selected welding device if said primary IP address and said current alternate IP address, if existing, of said selected welding device are determined not to be within said predetermined subnet and said new alternate IP address is generated and assigned to said selected welding device.

5. The method of claim 1 wherein said broadcast discovery request originates at a host computer operatively connected to said network.

6. The method of claim 1 wherein said monitoring step is automatically performed by a host computer operatively connected to said network.

7. The method of claim 1 wherein said selecting step is manually performed by a user of a host computer operatively connected to said network.

8. The method of claim 1 further comprising automatically presenting said list of said devices to a user in a displayed application window of a host computer.

9. The method of claim 1 wherein said determining steps are automatically performed by a host computer operatively connected to said network.

10. The method of claim 1 wherein said predetermined subnet is a subnet of a host computer operatively connected to said network.

11. The method of claim 1 wherein said generating step is automatically performed by a host computer operatively connected to said network using a subnet mask and a subnet of said host computer and a random number generated by said host computer.

12. The method of claim 1 wherein said checking step is automatically performed via an address resolution protocol (ARP) which is part of an operating system of a host computer that is operatively connected to said network.

13. The method of claim 1 wherein said assigning step is automatically performed by a host computer operatively connected to said network by sending a broadcast message over said network wherein said broadcast message includes a media access control (MAC) address of said selected welding device and said new alternate IP address.

14. The method of claim 2 wherein said attempting step is automatically performed by a host computer operatively connected to said network.

15. The method of claim 3 wherein said attempting step is automatically performed by a host computer operatively connected to said network.

16. The method of claim 4 wherein said attempting step is automatically performed by a host computer operatively connected to said network.

17. The method of claim 1 wherein said step of determining if a primary IP address of said selected welding device is within a predetermined subnet is performed by a host computer operatively connected to said network using a subnet mask of said host computer operating on said primary IP address.

18. The method of claim 1 wherein said step of determining if a current alternate IP address of said selected welding device is within a predetermined subnet is performed by a host computer operatively connected to said network using subnet mask of said host computer operating on said current alternate IP address.

19. The method of claim 1 wherein said selected welding device includes one of a welding power source, a welding wire feeder, a welding user interface, and a welding robot.

20. A non-transitory computer readable medium having encoded thereon computer executable instructions for performing a method of initially establishing communication with a welding device on a local area network (LAN) in a substantially automated manner, wherein said method comprises:

transmitting a broadcast discovery request over said network;

monitoring said network for responses to said broadcast discovery request from devices connected to said network;

selecting a welding device from a list of said devices that respond to said broadcast discovery request, and transmitting a broadcast message causing an indicator on said selected welding device to activate;

determining if a primary IP address of said selected welding device is within a predetermined subnet;

determining if a current alternate IP address of said selected welding device is within said predetermined subnet if said current alternate IP address exists and if said primary IP address is determined not to be within said predetermined subnet;

generating a new alternate IP address if said primary IP address and said current alternate IP address, if existing, of said selected welding device are determined not to be within said predetermined subnet;

checking that said new alternate IP address does not already exist on the network if said new alternate IP address is generated; and assigning said new alternate IP address to said selected welding device if said new alternate IP address is generated and said new alternate IP address does not already exist on the network.

21. The computer readable medium of claim 20 wherein said method further comprises attempting to connect to said primary IP address of said selected welding device if said primary IP address of said selected welding device is determined to be within said predetermined subnet.

22. The computer readable medium of claim 20 wherein said method further comprises attempting to connect to said current alternate IP address of said selected welding device if said primary IP address of said selected welding device is determined not to be within said predetermined subnet and said current alternate IP address of said selected welding device is determined to be within said predetermined subnet.

23. The computer readable medium of claim 20 wherein said method further comprises attempting to connect to said new alternate IP address of said selected welding device if said primary IP address and said current alternate IP address of said selected welding device, if existing, are determined not to be within said predetermined subnet and said new alternate IP address is generated and assigned to said selected welding device.

24. A computer-based apparatus for initially establishing communication with a welding device on a local area network (LAN) in a substantially automated manner, said computer-based apparatus comprising:
means for transmitting a broadcast discovery request over said network;
means for monitoring said network for responses to said broadcast discovery request from devices connected to said network;
means for selecting a welding device from a list of said devices that respond to said broadcast discovery request, and transmitting a broadcast message causing an indicator on said selected welding device to activate;
means for determining if a primary IP address of said selected welding device is within a subnet of said computer-based apparatus;
means for determining if a current alternate IP address of said selected welding device is within said subnet of said computer-based apparatus if said primary IP address is determined not to be within said subnet of said computer-based apparatus;
means for generating a new alternate IP address if said primary IP address and said current alternate IP address, if existing, of said selected welding device are determined not to be within said subnet of said computer-based apparatus;
means for checking that said new alternate IP address does not already exist on the network if said new alternate IP address is generated; and
means for assigning said new alternate IP address to said selected welding device if said new alternate IP address is generated and said new alternate IP address does not already exist on the network.

25. The computer-based apparatus of claim 24 further comprising means for attempting to connect to said primary IP address of said selected welding device if said primary IP address of said selected welding device is determined to be within said subnet of said computer-based apparatus.

26. The computer-based apparatus of claim 24 further comprising means for attempting to connect to said current alternate IP address of said selected welding device if said primary IP address of said selected welding device is determined not to be within said subnet of said computer-based apparatus and said current alternate IP address of said selected welding device is determined to be within said subnet of said computer-based apparatus.

27. The computer-based apparatus of claim 24 further comprising means for attempting to connect to said new alternate IP address of said selected welding device if said primary IP address and said current alternate IP address, if existing, of said selected welding device are determined not to be within said subnet of said computer-based apparatus and said new alternate IP address is generated and assigned to said selected welding device.

28. The computer-based apparatus of claim 24 further comprising means for displaying said list of said devices.

29. The computer-based apparatus of claim 24 wherein said means for generating generates a random number and operates on said random number and a subnet mask and a subnet of said computer-based apparatus in order to generate said new alternate IP address.

30. The computer-based apparatus of claim 24 wherein said means for assigning sends a broadcast message over said network wherein said broadcast message includes a media access control (MAC) address of said selected welding device and said new alternate IP address.

31. The computer-based apparatus of claim 24 wherein said means for determining if a primary IP address of said selected welding device is within a subnet of said computer-based apparatus uses a subnet mask of said computer-based apparatus operating on said primary IP address.

32. The computer-based apparatus of claim 24 wherein said means for determining if a current alternate IP address of said selected welding device is within a subnet of said computer-based apparatus uses a subnet mask of said computer-based apparatus operating on said current alternate IP address.

33. A computer-based apparatus, said computer-based apparatus comprising a software application for initially establishing communication with a welding device on a local area network (LAN) in a substantially automated manner by:
launching a broadcast discovery request over said network;
monitoring said network for responses to said broadcast discovery request from devices connected to said network;
allowing selection of a welding device from a list of said devices that respond to said broadcast discovery request, and transmitting a broadcast message causing an indicator on said selected welding device to activate;
determining if a primary IP address of said selected welding device is within a subnet of said computer-based apparatus;
determining if a current alternate IP address of said selected welding device is within said subnet of said computer-based apparatus if said current alternate IP address exists and if said primary IP address is determined not to be within said subnet of said computer-based apparatus;
generating a new alternate IP address if said primary IP address and said current alternate IP address, if existing, of said selected welding device are determined not to be within said subnet of said computer-based apparatus;
checking that said new alternate IP address does not already exist on the network if said new alternate IP address is generated; and
assigning said new alternate IP address to said selected welding device if said new alternate IP address is generated and said new alternate IP address does not already exist on the network.

34. The computer-based apparatus of claim 33 wherein said software application further attempts to connect to said primary IP address of said selected welding device if said primary IP address of said selected welding device is determined to be within said subnet of said computer-based apparatus.

35. The computer-based apparatus of claim 33 wherein said software application further attempts to connect to said current alternate IP address of said selected welding device if said primary IP address of said selected welding device is determined not to be within said subnet of said computer-based apparatus and said current alternate IP address of said selected welding device is determined to be within said subnet of said computer-based apparatus.

36. The computer-based apparatus of claim 33 wherein said software application further attempts to connect to said new alternate IP address of said selected welding device if said primary IP address and said current alternate IP address, if existing, of said selected welding device are determined not to be within said subnet of said computer-based apparatus and said new alternate IP address is generated and assigned to said selected welding device.

37. The computer-based apparatus of claim 33 wherein said software application further provides for displaying of said list of said devices in an application window.

38. The computer-based apparatus of claim 33 wherein said software application generates said new alternate IP address by generating a random number and operating on said random number and a subnet mask and a subnet of said computer-based apparatus.

39. The computer-based apparatus of claim 33 wherein said software application assigns said new alternate IP address by launching a broadcast message over said network wherein said broadcast message includes a media access control (MAC) address of said selected welding device and said new alternate IP address.

40. The computer-based apparatus of claim 33 wherein said software application determines if said primary IP address of said selected welding device is within said subnet of said computer-based apparatus by applying a subnet mask of said computer-based apparatus to said primary IP address.

41. The computer-based apparatus of claim 33 wherein said software application determines if said current alternate IP address of said selected welding device is within said subnet of said computer-based apparatus by applying a subnet mask of said computer-based apparatus to said current alternate IP address.

42. The method of claim 1 wherein said indicator is a light-emitting diode.

43. The computer readable medium of claim 20 wherein said indicator is a light-emitting diode.

44. The computer-based apparatus of claim 33 wherein said indicator is a light-emitting diode.

* * * * *